T. C. MERZ.
CHAIN CARRIER.
APPLICATION FILED NOV. 21, 1910.
993,313.
Patented May 23, 1911.
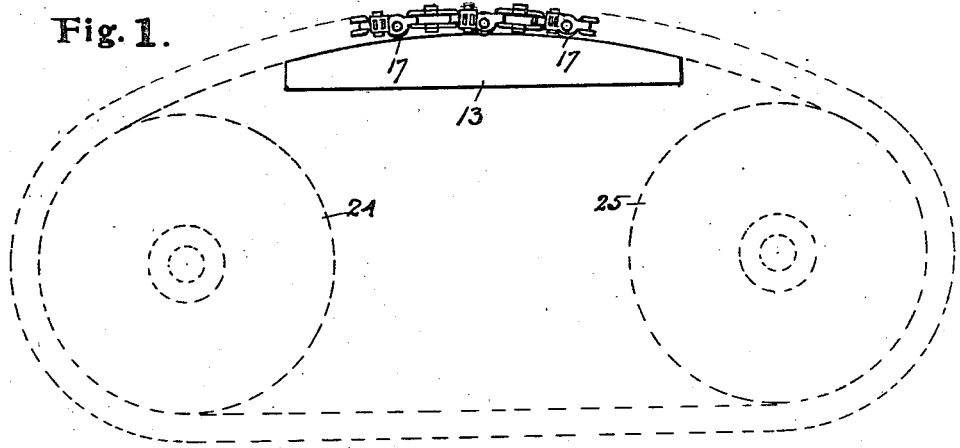
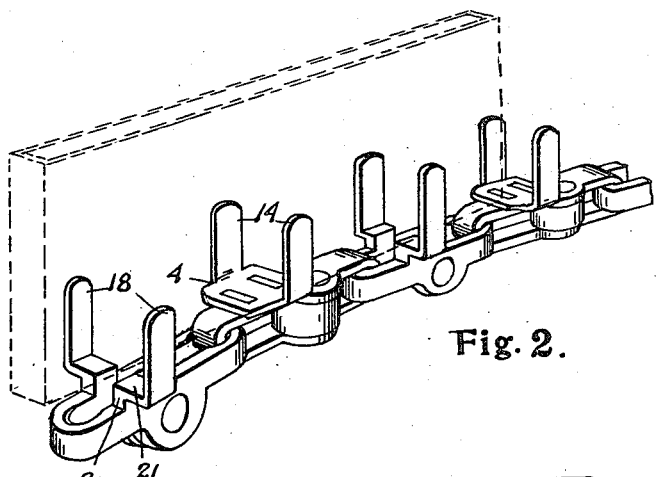
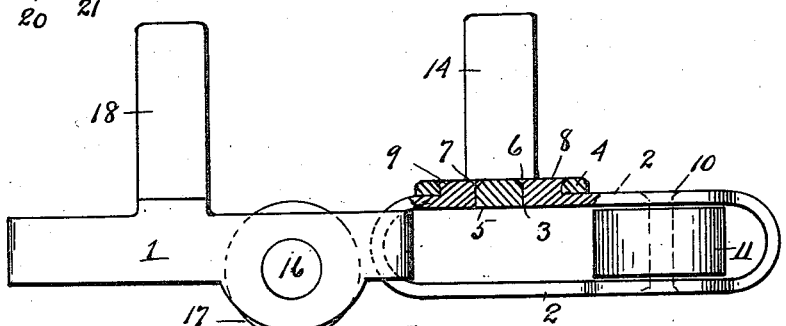
Witnesses
Inventor
Theodore C. Merz
By Parker & Burton
By C. T. Burton
a member of the firm
Attorneys

UNITED STATES PATENT OFFICE.

THEODORE C. MERZ, OF DETROIT, MICHIGAN, ASSIGNOR TO MERZ CAPSULE COMPANY, OF DETROIT, MICHIGAN, A CORPORATION OF MICHIGAN.

CHAIN CARRIER.

993,313.

Specification of Letters Patent.

Patented May 23, 1911.

Application filed November 21, 1910. Serial No. 593,339.

*To all whom it may concern:*

Be it known that I, THEODORE C. MERZ, a citizen of the United States, residing at Detroit, county of Wayne, State of Michigan, have invented a certain new and useful Improvement in Chain Carriers, and declare the following to be a full, clear, and exact description of the same, such as will enable others skilled in the art to which it pertains to make and use the same, reference being had to the accompanying drawings, which form a part of this specification.

This invention relates to chain carriers.

It has for its object an improved construction of linked or chained carrier adapted to be driven by the arms of a revolving wheel similar in character to a sprocket wheel and to travel along arched lines.

In the drawings:—Figure 1, is a diagram indicating the means of driving and the direction of travel between the driving wheels. Fig. 2, is a perspective of a similar portion of the chain indicating the manner of holding a load for transportation thereon. Fig. 3, is a side elevation partly in section showing the character of the two different links connected up to form the chain.

Referring to Fig. 3, the link 1 is provided with a horizontal axle and the consecutive link 2 is provided with a vertical axle. Each of the links consists of an oval loop of rigid material, and one of the links is preferably made with an opening 3 through the sides thereof closed by a plate 4 which is provided with a fillet 5 that fills the space between the ends 6 and 7 bounding the opening 3. The plate is secured to the body of the link by riveting the terminals of the link body to the plate. A preferred form of such rivet connection is made by forming the ends of the link with side lugs 8 and 9 which engage through the slots in the plate 4 and are riveted down to hold the plate 4 securely against the sides of the loop. The ends of the links are curved to engage as a universal coupling through the similarly formed ends of the link 1. The link 2 is provided with a vertical axle 10 upon which is journaled a bearing wheel 11. The periphery of the wheel 11 extends at each side of the link and is adapted to bear against the side guide 13 (seen in Fig. 1). The link is provided with posts or standards 14, preferably rising from the plate 4; the standards 14 hold to the link when used as a carrier the article to be transported. The link 1 is preferably made as a closed link and is provided with a horizontal axle 16 upon which is mounted a carrying wheel 17. The link 1 is also provided with standards 18, preferably rising one at each side of the link. By making the links alternately solid and split they may be readily assembled into chain form, if the assembling is accomplished before the wheel 11 is placed in position, and generally the assembling is accomplished before any of the wheels are placed in position. By using the plate 4 with the standards 14 the standards may be made of any desired length without interfering with the facility of assembling, and especially can this assembling be readily accomplished if the standards 18, of which there are two, one rising at each side of the link, rise from bases 20 which support a horizontal connection or jogged portion 21 between the base part of the standard and the upper terminal of the standard. The upper terminals of the standards (both 14 and 18) are spread the desired distance to accommodate the article to be carried, and are spread sufficiently to enable the chain to assume the necessary curvature along its path with the article to be carried placed on the chain and resting on the horizontal or tabular parts connecting the base and terminals of the posts 18 and the tabular part of the plate 4 from which the standards 14 rise.

The carrier chain is driven by sprocket wheels 24 and 25 and is guided by a curved guide (as 13) that rises from the floor on which the chain runs and rises to a sufficient height to contact the vertically journaled roller 11.

What I claim is:—

1. A chain carrier, having in combination a plurality of links alternately, vertically and horizontally disposed, each horizontally disposed link having a vertically disposed anti-friction roller journaled therein midway its ends, leaving a free space between the roller and each end, each vertically disposed link having a horizontally disposed anti-friction roller journaled therein midway the ends and leaving a free space between the roller and each end, the said links being universally joined by linking the adjacent ends of two adjoining links within the said free spaces between each roller and each end, and posts rising from the links, substantially as described.

2. A chain carrier, having in combination with a driving wheel, a traction floor, guides stationed at any desired point on said floor, an endless chain driven by said driving wheel running on said floor and directed by being passed around or against said guides, the said chain comprising a plurality of links of oval loop form linked together, each link having an anti-friction roller journaled therein alternately, horizontally and vertically in each succeeding link, and posts or standards rising from said links, whereby one set of rollers serves for traction purposes and the other set to prevent friction with the guides, substantially as described.

3. A carrier chain, comprising a plurality of links in the form of oval loops having anti-friction rollers journaled transverse the loops midway the ends, the links being looped together at their ends and each lying at substantially a right angle to its adjacent link, the horizontally disposed links being endless and solid, the vertically disposed links having meeting ends turned up, and a plate having posts rising therefrom and adapted to support the load carried by the chain, the said plate having slots in which the up-turned ends of the link are inserted, thereby fastening the ends together, substantially as described.

In testimony whereof, I sign this specification in the presence of two witnesses.

THEODORE C. MERZ.

Witnesses:
VIRGINIA C. SPRATT,
WILLIAM M. SWAN.